US00RE35872E

United States Patent [19]

Fenner et al.

[11] E Patent Number: Re. 35,872

[45] Reissued Date of Patent: Aug. 18, 1998

[54] SUPERCONDUCTING DETECTOR ASSEMBLY AND APPARATUS UTILIZING SAME

[75] Inventors: David B. Fenner, Simsbury; Robert M. Carangelo, Glastonbury, both of Conn.

[73] Assignee: Advanced Fuel Research, Inc., East Hartford, Conn.

[21] Appl. No.: 633,483

[22] Filed: Apr. 17, 1996

Related U.S. Patent Documents

Reissue of:

[64] Patent No.: 5,354,989
Issued: Oct. 11, 1994
Appl. No.: 997,457
Filed: Dec. 28, 1992

[51] Int. Cl.[6] ..... G01J 3/51; H01L 27/146; H01L 39/00

[52] U.S. Cl. ..... 250/336.2; 250/338.4

[58] Field of Search ..... 250/336.2, 338.4

[56] References Cited

U.S. PATENT DOCUMENTS 5,043,580 8/1991 Hartemann .
5,171,733 12/1992 Hu .

FOREIGN PATENT DOCUMENTS 0223136 5/1987 European Pat. Off. .
722749 1/1955 United Kingdom .

*Primary Examiner*—Constantine Hannaher
*Attorney, Agent, or Firm*—Ira S. Dorman

[57] ABSTRACT

An array of superconducting bolometers, assembled with a superposed interference layer of graduated thickness, provides a microelectronic detector assembly that discriminates radiation impinging thereon, as a function of wavelength, and that can be used for transform spectroscopy, color-imaging, and the like. The interference coating will preferably be of step-like form, with each plateau of the structure being of the same spatial extent as the bolometer with which it is associated.

18 Claims, 3 Drawing Sheets

SUPERCONDUCTING DETECTOR ASSEMBLY AND APPARATUS UTILIZING SAME

Matter enclosed in heavy brackets [ ] appears in the original patent but forms no part of this reissue specification; matter printed in italics indicates the additions made by reissue.

The United States Government has rights in this invention pursuant to Contract No. ISI-9160506, awarded by the National Science Foundation.

This invention relates to integrated radiation detector assemblies, and to spectrometers and other apparatus incorporating the same.

BACKGROUND OF THE INVENTION

Conventional methods of infrared spectroscopy utilize either a small throughput (IR flux) optical element for dispersion, followed by a detector or a detector array, or a large throughput, scanning interferometer followed by a detector. In application of the first technique, the spectrum is accessed directly in the wavelength and frequency domain, while in the second the spectrum is measured in the time domain and then transformed (typically using Fourier algorithms) by a post-measurement calculation to the wavenumber domain.

As is known to those skilled in the art, the first method is relatively simple to implement, but is also of relatively low sensitivity due to the small amount of light throughput involved; in addition, long scanning times are required if the spectral range encompassed is substantial, and the instrument itself must be fairly large if good resolution is to be had. On the other hand, methods using scanning interferometers find wide application in Fourier-transform infrared (FT-IR) spectroscopy and in other specialized applications (e.g., piezoelectric scanning Fabry-Perot interferometers), but the instruments employed can be very complex and expensive, and can lack durability, largely because of their requirement for high-precision moving optics.

Additional limitations, common to both spectroscopy methods described, are related to the materials presently available for IR detectors. Current detector technology is based either upon photoelectric semiconductor materials, which are of a narrow band character, or upon broad-band but low-sensitivity photo-thermal materials, which are of slow response; both kinds of materials are, in addition, difficult to fabricate into satisfactory arrays.

SUMMARY OF THE INVENTION

Accordingly, it is the broad object of the present invention to provide a novel detector assembly that is capable of discriminating, as a function of wavelength, spectral radiation impinging thereupon.

More specific objects of the invention are to provide such an assembly which is itself capable of directly accomplishing transform spectroscopy, and to provide a spectrometer incorporating the same.

Other specific objects are to provide such an assembly which is adapted for use in color-imaging applications, and to provide color-imaging apparatus incorporating the same.

Additional objects of the invention are to provide such a detector assembly, spectrometer and other apparatus that is small and compact, durable, incomplex and relatively inexpensive to construct, and that nevertheless provides outstanding levels of sensitivity and response speed.

It has now been found that certain of the foregoing and related objects of the invention are attained by the provision of a detector assembly comprised of a plurality of superconductor bolometers arranged as an array, and a superposed anti-reflection layer functioning as a graded interference filter. The bolometers have substantially contiguous operative surfaces that provide at least one planar face for irradiation, and all of them are responsive to radiation throughout substantially a given range of wavelengths. The interference layer is superposed upon the irradiation face of the array, with an associated region in registry with each of the bolometers; it is composed of a material that transmits selectively, as a function of its thickness, multiple bands of wavelengths of radiation in the given range. The several regions of the interference layer vary in thickness to thereby provide, in combination with the associated bolometers, a plurality of detectors that differ from one another in their radiation wavelength response.

In the preferred embodiments of the invention each region of the interference layer will be of substantially constant thickness throughout, and will be dimensioned and configured to intercept and filter substantially all of the radiation that impinges upon the associated bolometer. Indeed, certain objects of the invention may be attained by the provision of a detector assembly that employs nonsuperconducting photothermal detectors (e.g., bolometers) in combination with an interference layer of such structure. The layer will, in any event, advantageously be of step-like form and will normally be of uniform composition throughout. The bolometers will most desirably be fabricated from a high temperature superconducting film that is epitaxial on the underlying substrate, formed as a meanderline element and responsive to wavelengths in the range 1 μm to 1000 μm, and most desirably in the infrared region of the spectrum.

The assembly will generally include a substrate that is at least coextensive with the bolometer array, in which case the interference layer may be disposed outwardly adjacent either the substrate or the bolometer array. Although a submicron air gap may be present, the assembly will preferably be devoid of spacing between the irradiation face and the interference layer when those components are adjacently disposed; a buffer film will usually be interposed between the array and the substrate, and a passivation layer may be provided on the face of the array that is opposite to the substrate.

Other objects of the invention are attained by the provision of a spectrometer comprising, in combination: a superconductor detector assembly, as described herein; means for maintaining the assembly at cryogenic temperatures in a range for varying the conductance of the bolometers; means, operatively connected to the array, for generating electrical currents indicative of the conductance of the bolometers after passage therethrough; and electronic data processing means for transforming the currents generated so as to produce signals representative of the energy of radiation caused to impinge upon the irradiation face, discriminated as a function of wavelength. Preferred embodiments of the spectrometer will further include means for causing radiation to impinge upon the irradiation face of the bolometer array, as well as a radiation source for generating spectral radiation within the range of intended operation. The data processing means will most desirably function to apply matrix-inversion transform algorithms (e.g., Fourier and bilinear) to the generated electrical currents, for producing the representative signals.

Additional objects are attained by the provision of a color-imaging apparatus in which is included a substrate having an irradiation surface, on which is arranged a multiplicity of the detector assemblies described. The detector assemblies all include the same combination of detectors having different response characteristics, and they are arranged with the bolometers exposed for irradiation on the substrate surface; typically, each detector assembly will consist of three different detectors. Additionally included in the apparatus may be means for causing radiation to impinge upon the irradiation surface, means operatively connected to the bolometers for generating electrical currents, and display means operatively connected for receiving such currents from the means for generating and the bolometers, and for displaying the spatial distribution of different wavelength components of the impinging radiation.

DETAILED DESCRIPTION OF THE ILLUSTRATED EMBODIMENTS

Figures 1, 7:
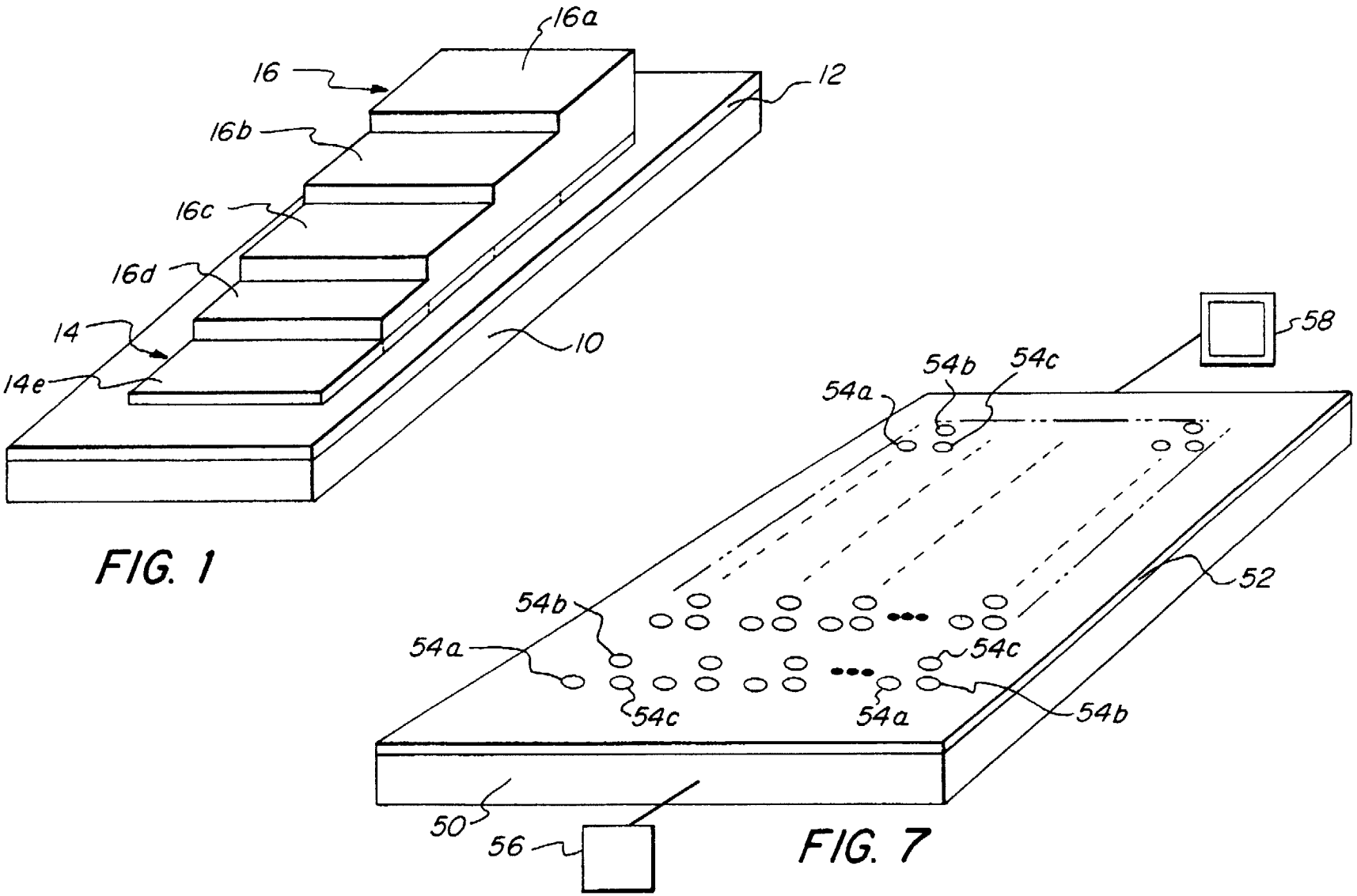
FIG. 1 is a diagrammatic perspective view of a rectilinear detector assembly embodying the present invention, suitable for use in transform spectroscopy.
FIG. 7 is a diagrammatic perspective view of a panel for three-color imaging apparatus embodying the invention.
Figure 2:
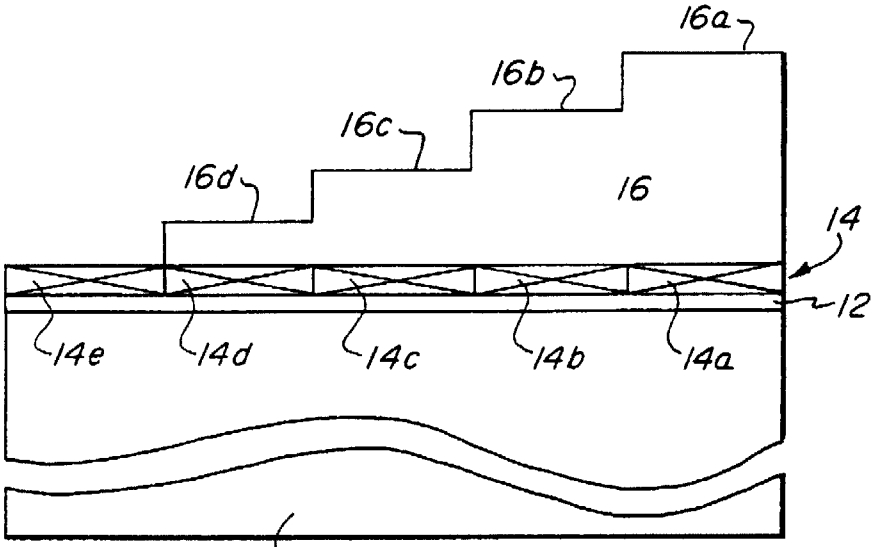
FIG. 2 is a fragmentary, diagrammatic elevational view of the assembly of FIG. 1.

Turning initially to FIGS. 1 and 2 of the drawings, the detector assembly illustrated consists of a substrate 10 (e.g., a silicon wafer), a buffer film 12 (e.g., of yttrium-stabilized zirconia) deposited thereupon, a bolometer array made of a high-temperature superconducting film (e.g., YBCO), generally designated by the numeral 14, and, as a graded interference filter, an interference layer, generally designated by the numeral 16, superposed upon the bolometer array. Each of the steps 16a, 16b, 16c and 16d of the layer 16 overlies and registers with the operative area an associated bolometer 14a, 14b, 14c and 14d of the array 14, thereby rendering the bolometers effective to detect different, narrow interference bands of radiation; the bolometer 14e remains responsive to a broad range of wavelengths, as being unattenuated by filtration, and functions as a reference detector.

Figure 3:
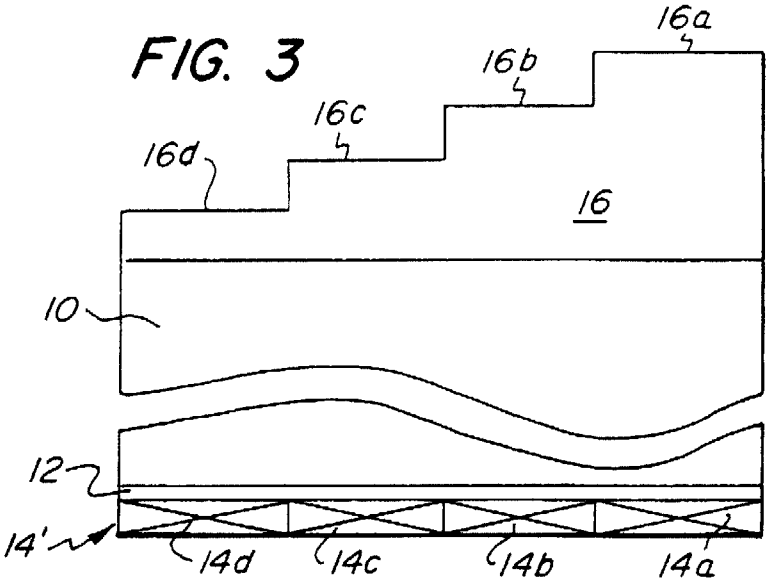
FIG. 3 is a fragmentary, diagrammatic elevational view showing an alternative arrangement of the components of the assembly of the preceding Figures.
Figure 4:
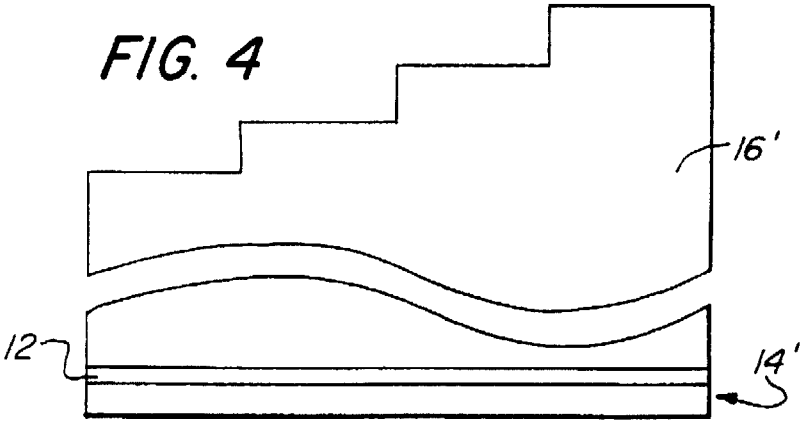
FIG. 4 is a view similar to FIGS. 2 and 3, illustrating a further embodiment of the detector assembly in which no separate substrate component is employed.

The detector assembly of FIG. 3 is fabricated from the same components (omitting however the bolometer 14e), arranged for backside illumination. Thus, rather than being disposed between the substrate and the filter, the bolometer array 14' is positioned on the surface of the substrate 10 (with an interposed buffer layer 12) opposite to that on which the interference layer 16 is disposed. In the assembly of FIG. 4, the layer 16' serves both as the substrate for the array 14' and also as the interference filter.

Figure 5:
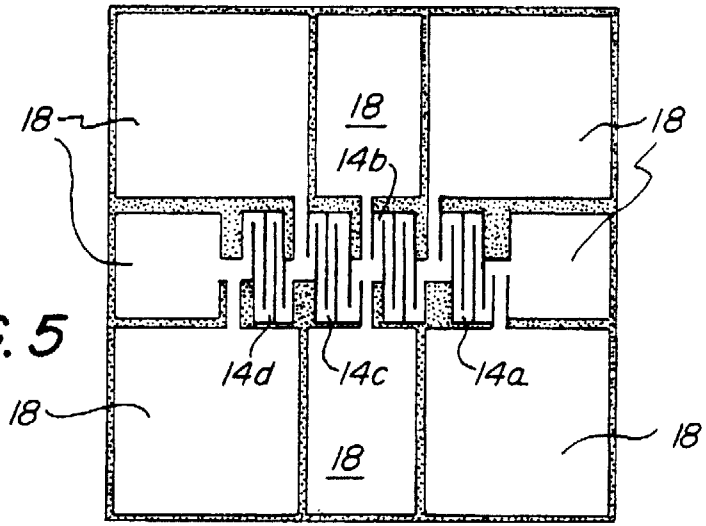
FIG. 5 is a plan view of a bolometer array and associated contact pads, suitable for use in fabricating the detectors employed in the assemblies of the invention.

FIG. 5 shows a series-connected "quad" bolometer array pattern, fabricated (as by a microlithographic technique) from a single film of material and carried upon a substrate. Each of the bolometers 14a through 14d consists of a meanderline, to which is connected suitable electrical contact pads 18.

Figure 6:
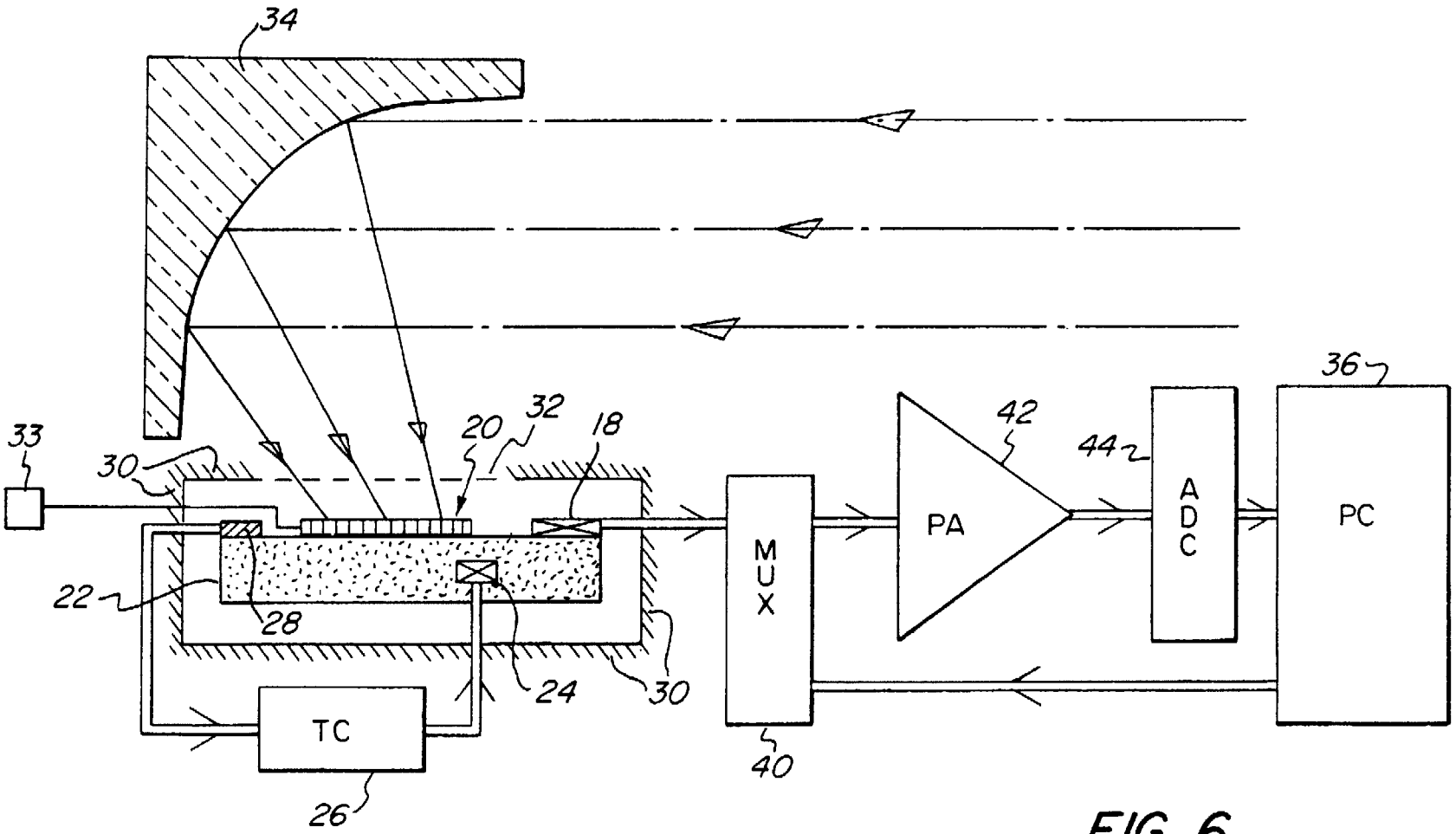
FIG. 6 is a diagrammatic representation of a spectrometer embodying the present invention.

The spectrometer apparatus of FIG. 6 utilizes a superconductor detector assembly, generally designated by the numeral 20, comprised of the components 10, 12, 14 and 16 (not shown), formed and arranged as hereinabove described with reference to the preceding Figures. The assembly 20 is supported upon a refrigerated cryostage mounting block 22, surrounded by cryostat walls 30; an electrical heater 24 is embedded in the block 22, the power to which is regulated by the temperature controller (TC) 26 in response to the cryostage temperature, as measured by the thermometer 28. The detector assembly 20 is positioned for illumination by radiation reflected from a focusing mirror 34 through the window 32. A power supply 33 is connected to the bolometers of the assembly 20. Current passing through the bolometers from the power supply 33, as affected by their conductance in response to transmitted radiant energy, generates electrical signals at the contact pads 18. The signals are in turn processed by application of transform algorithms in the computer (PC) 36, passing thereto through a multiplexer (MUX) 40, a preamplifier (PA) 42, and an analog-to-digital converter (ADC) 44, all in a conventional manner.

A panel suitable for use in three-color imaging apparatus is depicted in FIG. 7, and consists of a substrate 50 of semiconductor material, upon which is deposited a buffer film 52. Numerous identical detector assemblies are formed upon what is to be the irradiation surface of the panel, each assembly being composed of the same triangular array of three detectors 54a, 54b and 54c. Although not specifically illustrated, it will be appreciated that a superposed graded interference filter renders each detector of the assembly responsive to a selected radiation "color" band that is different from the bands to which the other two detectors respond; multilayer coatings may be employed in certain instances to further define the sensitivity of the detectors. A power supply 56 and a video display terminal 58 are operatively connected to the panel, with the terminal serving of course to display, as a function of wavelength, the spatial distribution of the components of the impinging radiation.

Although certain embodiments of the instant detector assembly may utilize bolometers of a non-superconducting nature, those fabricated from high-temperature superconducting components, and particularly from films epitaxially deposited upon the substrate, are most preferred. In accordance herewith, a film will generally be deemed to exhibit high-temperature superconducting properties if it demonstrates a maximum zero-resistance state up to 80K, or higher. Not only can such detectors afford an extremely broad band of radiation response, but they are in addition capable of production as monolithic arrays (i.e., etched into a single film) by use of known micro-fabrication techniques, making an extensive detector array possible and integrating effectively with existing silicon wafer and other microelectronic and thin-film technologies. These factors in turn make feasible the provision of an on-chip spectrometer and other microelectronic optical devices, using the detector assemblies described, with the self-evident benefits that are attendant thereto.

The superconducting film employed will preferably be of a compound having the general formula $RBa_2(Cu,M)_3O_{(7-\delta)}$, in which R designates at least one of the rare earth elements: yttrium, lanthanum, neodymium, samarium, europium, gadolinium, dysprosium, lutetium, and holmium, and in which M is either null or designates at least one of the transition elements: silver, gold, nickel, aluminum, zinc, cobalt, iron, palladium and platinum. It will be appreciated that the foregoing general formula implies non-exact stoichiometry, and that most commonly the superconductor film will be of a yttrium-barium-copper-oxygen (YBCO) compound.

As will be appreciated by those skilled in the art, a primary advantage in the use of high temperature superconducting bolometer devices resides in the exceptional temperature sensitivity that is afforded when the material is on the edge of its transition into the superconducting state. Under those conditions the heat equivalent value of even low-intensity irradiance will raise the temperature of the superconducting film sufficiently to cause a measurable change in its resistance, and hence to enable the generation of an electrical signal that is indicative of the energy passing to the bolometer. More particularly, these detectors utilize a photothermal process to cause electrical responses to the small temperature increases effected by the irradiance. By maintaining the film temperature near that for the middle of the resistive transition to the superconducting state, and by use of a suitable film pattern, a large resistance change will accompany small irradiances, typically a few μV to a few mV response per μW of irradiance; thus, spectral sensitivity is very high.

Pulsed laser deposition, or laser ablation, is advantageously used for synthesizing high-quality thin films of high-temperature superconductor ceramic oxides. The use of laser ablation to synthesize films of YBCO on silicon wafer substrates, for example, is found however to require a metal oxide buffer film, which will preferably be of a compound selected from the group consisting of zirconia, yttria, yttria-stabilized zirconia, calcia, calcia-stabilized zirconia, magnesia, ceria, magnesia-stabilized zirconia, $LaAlO_3$, $BaTiO_3$, $SrTiO_3$, and solid solutions of the latter two compounds. The buffer film of metal oxide should be deposited substantially epitaxially on the substrate surface, and (as noted above) the ceramic-oxide superconductor film should be deposited substantially epitaxially on the buffer film.

The substrate will usually be made of a monocrystalline semiconductor material, most desirably a silicon wafer or membrane. It may however be of any suitable alternative material, such as for example GaAs, $SrTiO_3$, MgO and yttria-stabilized zirconia. It will be appreciated that the metal oxide buffer film, interposed between the superconductor film layer and the substrate, serves to prevent such chemical reaction therebetween as would tend to destroy the superconductivity of the superconductor film, or to at least significantly depress its superconducting transition temperature. In any event, it is important that any buffer layer employed serve that function while still allowing the growth of a highly oriented superconducting film.

Although constituting no part of the instant invention, techniques are known by which a buffer film and a superconductor film can be deposited substantially epitaxially upon a semiconductor. In accordance therewith, the substrate is cleaned, passivated, and sequentially coated to produce the buffer and superconductor films; cleaning of the substrate surface may be effected by use of a spin-etch technique, and film deposition may be carried out by pulsed laser ablation. A protective layer or cap may also be provided upon the upper surface of the superconductor film, to stabilize it and prevent chemical degradation; cap layers may have the same composition as the buffer films.

Central to the invention is of course the antireflection coating or interference layer that is superposed upon the array of bolometers, which provides an interference filter of graded thickness; the layer may be bonded to the face of the array, or it may simply be disposed in close proximity to it. Most dielectric materials can be employed as the interference layer, provided of course that the material has a finite region of light transmission; standard tables of materials' transmission regions can therefore be used to assist in the selection. It is noted however that silicon exhibits nearly ideal IR-transmission characteristics at 77K, and hence may be employed to provide a very useful interference filter in the mid-infrared to far-infrared range. Moreover, the fact that silicon functions in such a highly effective manner, in combination with the superconducting films described, makes feasible the detector assembly shown in FIG. 4. But as a second example, if the spectral range of interest were from the visible to below 5 μm, $ZrO_2$ could be used as the interference layer.

Physically, it is important that the bolometer and associated filter element be of the same spatial extent; in the case of the stepped layer illustrated, therefore, the areas of the plateaus should match the effective areas of the associated bolometers, and should lie in close registration therewith. As will be appreciated, the optical length through the filter is a function of both the thickness of the layer and also the index of refraction of the material used. Therefore the profile of the interference layer and/or its properties can be varied to achieve the desired result; e.g., to pass a narrow band of radiation, in the case of a thermal- or color-imaging device, or to lead to the most useful transforms for purposes of spectrometry. A careful choice of the grading scheme can produce strong fringe contrast across the entire spectral region of interest, and can result in each element of the detector assembly having a spectral response that is partially or largely orthogonal to that of the other elements. It is in fact the extent of orthogonality in the transform that makes it advantageous in spectroscopy, since that renders the decoding algorithm simple, reducing the interference from cross terms.

Using a graded interference filter of the character described, periodic or pseudoperiodic intensity envelopes are generated over the array of detectors for each wavelength of interest, causing each of the detectors to register a spectral irradiance periodically modulated by passage through constructive and destructive optical interference conditions. The periodic nature of light encoding simplifies decoding, and involves the multiple advantage of measuring all wavelengths simultaneously. In addition, a large throughput of radiation to the detector is achieved, which enhances both the optical efficiency and also the signal-to-noise ratio for any given spectral acquisition.

It goes without saying that the level of resolution of a certain wavelength spectrum will vary in direct relationship to the number of detectors present in the assembly. Typically, an array of 1000 or more detectors will be employed, arranged as rectilinear, triangular, or rectangular arrays, or in any other suitable configuration. The associated mechanical, optical, electronic, circuitry, and data-processing components and software of any apparatus utilizing the detector assembly of the invention will of course be specifically adapted to an intended purpose, and the design, construction, implementation, and arrangement thereof will be evident to those skilled in the art. Nevertheless, it might be pointed out specifically that, in a spectrometer system, electronic circuitry will be provided to scan the detector array into a memory unit, where a computational transform would be applied to reconstruct the spectrum. Although applications involving the infrared region of the spectrum have been stressed herein, and will in many instances represent the best mode for carrying out the present invention, it will be appreciated that the underlying concepts will often be equally as applicable to other spectral regions.

Thus, it can be seen that the present invention provides a novel detector assembly that is capable of discriminating, as a function of wavelength, spectral radiation impinging thereupon, and that is suitable for use in apparatus for transform spectroscopy, color-imaging, and the like. The detectors are wavelength programmable to afford great flexibility of application, and the assembly and apparatus of the invention may be very small and highly compact, durable, incomplex, and relatively inexpensive to construct, while affording outstanding levels of sensitivity and speed of response.

Having thus described the invention, what is claimed is:

1. A transform spectrometer comprising, in combination:

(1) a detector assembly for discriminating as a function of wavelength, radiation impinging thereon, said detector assembly comprising:

a plurality of superconductor bolometers arranged as an array and having substantially contiguous operative surfaces providing at least one planar irradiation face, all of said bolometers being responsive to radiation throughout a given range of wavelengths; and an interference layer superposed upon said irradiation face of said array with an associated region of said layer in registry with each of said bolometers, said layer being composed of a material that produces constructive and destructive optical interference conditions to periodically modulate, and thereby transmit selectively as a function of layer thickness, multiple bands of wavelengths of radiation in said range, said regions differing from one another in thickness so as to constitute said layer a graded interference filter, and to thereby provide a plurality of detectors that differ from one another in their response to radiation within said given range, each of said detectors registering a spectral irradiance periodically modulated, thereby being capable of discriminating a plurality of wavelength bands;

(2) means for maintaining said detector assembly at cryogenic temperatures in a range for varying the conductance of said bolometers;

(3) means for generating electrical currents, said means for generating being operatively connected to said array; and (4) electronic data processing means for transforming said currents, after passage through said bolometers of said array, so as to produce signals representative of the energy of radiation caused to impinge upon said irradiation face, discriminated as a function of wavelength said data processing means functioning to apply matrix-inversion transform algorithms to said electrical current, for producing such signals.

2. The spectrometer of claim 1 wherein the thickness of each of said regions of said interference layer is substantially constant, and wherein each of said regions is dimensioned and configured to intercept and filter substantially all of the radiation that impinges upon said bolometer associated therewith.

3. The spectrometer of claim 2 wherein said layer is of step-like form.

4. The spectrometer of claim 1 wherein said layer is of uniform composition throughout.

5. The spectrometer of claim 4 wherein said layer is composed of silicon.

6. The spectrometer of claim 1 wherein said bolometers are fabricated from a high-temperature superconducting film.

7. The spectrometer of claim 6 wherein said superconducting film is composed of a compound having the general formula $RBa_2(Cu,M)_3O_{(7-\delta)}$, in which R designates at least one of the rare earth elements: yttrium, lanthanum, neodymium, samarium, europium, gadolinium, dysprosium, lutetium, and holmium, and in which M is either null or designates at least one of the transition elements: silver, gold, nickel, aluminum, zinc, cobalt, iron, palladium and platinum.

8. The spectrometer of claim 6 wherein said film is epitaxial on the underlying substrate.

9. The spectrometer of claim 6 wherein each of said bolometers comprises a meanderline element.

10. The spectrometer of claim 1 wherein said range of wavelengths to which said bolometers are responsive is 1 μm to 1000 μm.

11. The spectrometer of claim 1 further including a substrate that is at least coextensive with said bolometer array, said interference layer being disposed outwardly adjacent either said substrate or said array.

12. The spectrometer of claim 11 wherein said substrate comprises a silicon wafer.

13. The spectrometer of claim 11 further including a buffer film interposed between said array and said substrate.

14. The spectrometer of claim 1 wherein said assembly is devoid of spacing between said irradiation face and said interference layer.

15. The spectrometer of claim 1 further including means for causing radiation to impinge upon said irradiation face of said array.

16. The spectrometer of claim 1 wherein said spectrometer further includes a radiation source for generating spectral radiation within said given range.

17. The spectrometer of claim 1 wherein said given range of wavelengths to which said bolometers respond comprises the infrared region of the spectrum.

*18. A transform spectrometer comprising, in combination:*

*(1) a detector assembly for discriminating, as a function of wavelength, radiation impinging thereon, said detector assembly comprising: a plurality of photothermal detector elements arranged as an array and having substantially contiguous operative surfaces providing at least one planar irradiation face, all of said detector elements being responsive to radiation throughout a given range of wavelengths; and an interference layer superposed upon said irradiation face of said array with an associated region of said layer in registry with each of said detector elements, said layer being composed of a material that produces constructive and destructive optical interference conditions to periodically modulate, and thereby transmit selectively as a function of layer thickness, multiple bands of wavelengths of radiation in said range, said regions differing from one another in thickness so as to constitute said layer a graded interference filter, and to thereby provide a plurality of detectors that differ from one another in their response to radiation within said given range, each of said detectors registering a spectral irradiance periodically modulated, thereby being capable of discriminating a plurality of wavelength bands;*

*(2) means for generating electrical currents, said means for generating being operatively connected to said array; and*

(3) *electronic data processing means operatively connected for transforming electrical currents from said means for generating, after passage through said detector elements of said array, so as to produce signals representative of the energy of radiation caused to impinge upon said irradiation face, discriminated as a function of wavelength, said data processing means functioning to apply matrix-inversion transform algorithms to said electrical currents, for producing such signals.*

* * * * *